(12) United States Patent
Reba et al.

(10) Patent No.: US 12,378,888 B1
(45) Date of Patent: Aug. 5, 2025

(54) AIRFOIL-MOUNTED ACOUSTIC RESONATOR ARRAY FOR GAS TURBINE ENGINE COMPONENT

(71) Applicant: RTX Corporation, Farmington, CT (US)

(72) Inventors: Ramons A. Reba, South Windsor, CT (US); Benjamin G. Gardell, Bristol, CT (US); Michael Raymond LaFavor, Otisfield, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/430,130

(22) Filed: Feb. 1, 2024

(51) Int. Cl.
*F01D 5/18* (2006.01)
*F01D 9/04* (2006.01)

(52) U.S. Cl.
CPC ............. *F01D 5/18* (2013.01); *F01D 9/041* (2013.01); *F05D 2220/36* (2013.01); *F05D 2240/30* (2013.01)

(58) Field of Classification Search
CPC .... F02K 1/827; F02K 1/44; F02C 7/24; F02C 7/047; F05D 2250/283; F05D 2260/96; F05D 2260/963; F05D 2260/602; F05D 2220/36; F05D 2220/32; F05D 2240/30; B32B 2607/00; B32B 3/20; B32B 2305/024; F04D 29/665; F04D 29/324; F04D 29/664; F01D 25/30; F01D 5/147; F01D 9/02; F01D 5/16; F01D 5/18; F01D 9/041; F05B 2250/283; F05B 2260/96; B64C 1/40; B64C 21/02; B64C 7/02
See application file for complete search history.

(56) References Cited

U.S. PATENT DOCUMENTS

| | | | |
|---|---|---|---|
| 3,831,710 A * | 8/1974 | Wirt ........................ | B32B 27/08 428/116 |
| 7,607,287 B2 * | 10/2009 | Reba ..................... | F04D 29/665 416/232 |
| 11,028,779 B2 * | 6/2021 | Sidelkovskiy .......... | F01D 25/32 |
| 11,199,107 B2 | 12/2021 | Reba | |
| 11,286,857 B2 | 3/2022 | Geertsema et al. | |
| 11,286,859 B2 * | 3/2022 | Geertsema ............. | B64D 33/02 |
| 11,427,299 B2 | 8/2022 | Desjoyeaux et al. | |

* cited by examiner

*Primary Examiner* — Eric J Zamora Alvarez
(74) *Attorney, Agent, or Firm* — Carlson, Gaskey & Olds, P.C.

(57) ABSTRACT

A gas turbine engine component includes an airfoil extending between a leading edge and a trailing edge. The airfoil has hollow cells with walls separating the plurality of hollow cells. A perforated surface has a plurality of perforations and closes off the hollow cells. The hollow cells have a diverter plate which extends away from the face surface at a first angle for a first portion. A gas turbine engine and a method are also disclosed.

18 Claims, 7 Drawing Sheets

AIRFOIL-MOUNTED ACOUSTIC RESONATOR ARRAY FOR GAS TURBINE ENGINE COMPONENT

BACKGROUND

This application relates to an acoustic resonator array for use in an airfoil for a gas turbine engine.

Gas turbine engines are known, and typically include a propulsor such as a fan delivering air into a bypass duct as propulsion air. The air is also delivered into a compressor where it is mixed with fuel and ignited. Products of the combustion pass downstream over turbine rotors driving them to rotate. The turbine rotors in turn drive the propulsor and compressor rotors.

One type of propulsor is a fan mounted within an outer fan case. Static vanes having airfoils are positioned at an exit of the fan rotor, to direct the propulsion air in a desirable direction. The airflow is a source of noise, and thus it is known to provide acoustic resonator arrays in the fan exit guide vane.

The fan exit guide vanes have thin portions that cannot receive the cells associated with a typical acoustic resonator array. Moreover, liquid water can be captured within cells within the resonator array.

SUMMARY

In a featured embodiment, a gas turbine engine component includes an airfoil extending between a leading edge and a trailing edge. The airfoil has hollow cells with walls separating the plurality of hollow cells. A perforated surface has a plurality of perforations and closes off the hollow cells. The hollow cells have a diverter plate which extends away from the face surface at a first angle for a first portion.

In another embodiment according to the previous embodiment, the diverter plate has a ramp extending away from the first portion at an increased angle relative to the first angle.

In another embodiment according to any of the previous embodiments, the ramp ends before a separating wall to provide an opening further into the hollow cell.

In another embodiment according to any of the previous embodiments, the hollow cells are defined between four of the walls, with the first portion of the diverter plate extending to connect to all four of the walls, and the ramp connecting to two of the walls.

In another embodiment according to any of the previous embodiments, there are at least two columns of hollow cells within the gas turbine engine component with column walls of the walls separating adjacent ones of the hollow cells between the leading edge and the trailing edge, and between adjacent ones of the hollow cells in the first and second columns.

In another embodiment according to any of the previous embodiments, the column walls separating adjacent ones of the hollow cells in the first and second columns are staggered relative to adjacent ones of the column walls separating the hollow cells in the first and second columns.

In another embodiment according to any of the previous embodiments, drainage holes are formed in the column walls separating the first and second columns to allow fluid to pass from one the hollow cell in one column to one the hollow cell in the other column.

In another embodiment according to any of the previous embodiments, the walls separating adjacent hollow cells between the leading edge and the trailing edge extend at an angle that is non-perpendicular to the perforated surface.

In another embodiment according to any of the previous embodiments, drainage holes are formed in outer ones of the walls defining the gas turbine engine component.

In another embodiment according to any of the previous embodiments, the gas turbine engine component is a static vane for use in a fan section.

In another embodiment according to any of the previous embodiments, the diverter plate extends directly away from the face surface, and is connected to the perforated face surface.

In another embodiment according to any of the previous embodiments, the diverter plate extends away from the perforated face surface at a first angle, but is not connected to the perforated face surface.

In another featured embodiment, a gas turbine engine includes a fan section for delivering air into a bypass duct and for delivering air into a compressor section, a compressor section, a combustor and a turbine section. The fan section includes a fan rotor. Fan exit guide vanes are positioned downstream of the fan rotor. The fan exit guide vanes have an airfoil extending between a leading edge and a trailing edge. The airfoil has hollow cells with walls separating the plurality of hollow cells. A perforated surface has a plurality of perforations and closing off the hollow cells, and having a plurality of perforations, the hollow cells provided with a diverter plate which extends away from the face surface at a first angle for a first portion.

In another embodiment according to any of the previous embodiments, the diverter plate has a ramp extending away from the first portion at an increased angle relative to the first angle.

In another embodiment according to any of the previous embodiments, the hollow cells are defined between four of the walls, with the first portion of the diverter plate extending to connect to all four of the walls, and the ramp connecting to two of the walls.

In another embodiment according to any of the previous embodiments, there are at least two columns of hollow cells within the gas turbine engine component with column walls of the walls separating adjacent ones of the hollow cells between the leading edge and the trailing edge, and between adjacent ones of the hollow cells in the first and second columns.

In another embodiment according to any of the previous embodiments, the column walls separating adjacent ones of the hollow cells in the first and second columns are staggered relative to adjacent ones of the column walls separating the hollow cells in the first and second columns.

In another embodiment according to any of the previous embodiments, drainage holes are formed in the walls separating the first and second columns to allow fluid to pass from one the hollow cell in one column to one the hollow cell in the other column.

In another embodiment according to any of the previous embodiments, drainage holes are formed in outer ones of the walls defining the gas turbine engine component.

In another featured embodiment, a method of forming a gas turbine engine component includes the steps of utilizing additive manufacturing to form a gas turbine engine component having an airfoil extending between a leading edge and a trailing edge. The airfoil has hollow cells with walls separating the plurality of hollow cells, and a perforated surface having a plurality of perforations closing off the hollow cells. The hollow cells are provided with a diverter plate which extends away from the face surface at a first angle for a first portion, and then reaching a ramp extending away from the first portion at an increased angle relative to the first angle.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
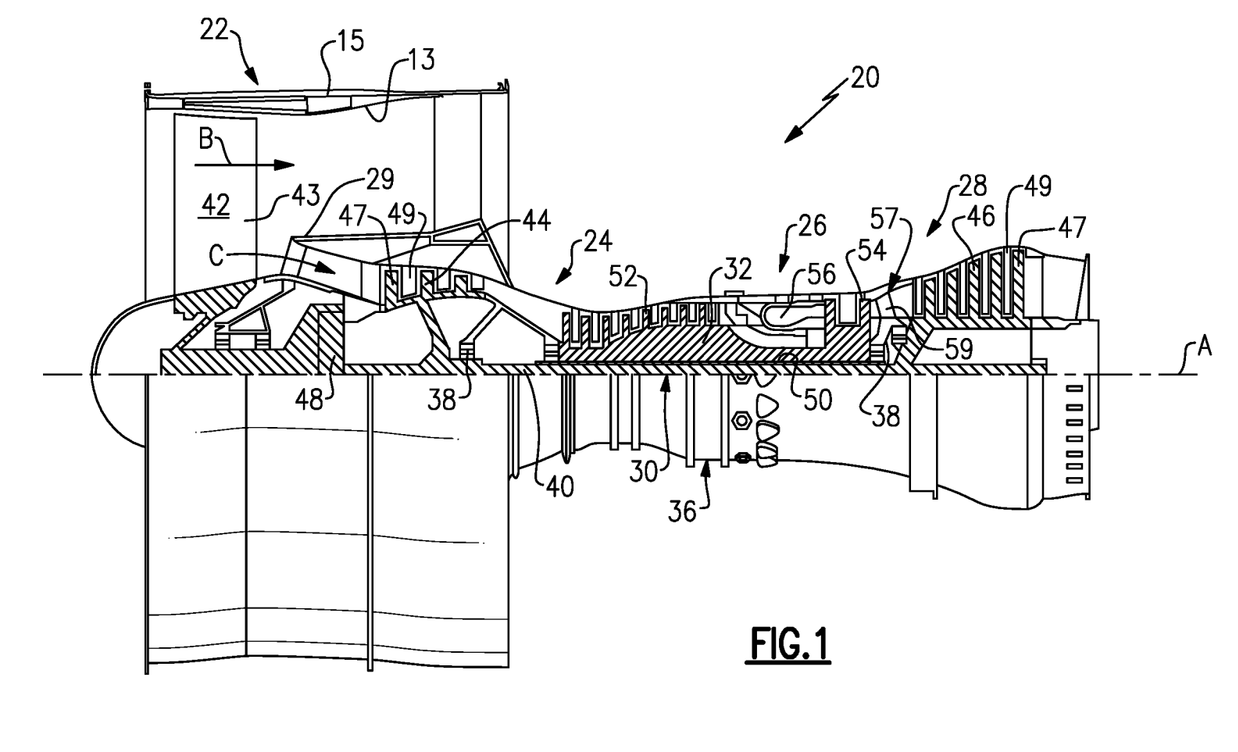
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
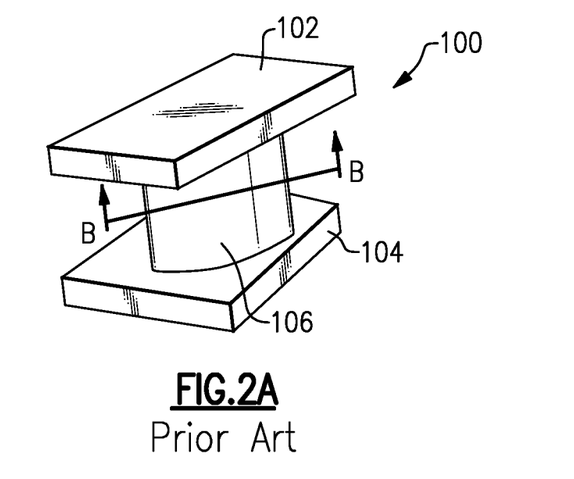
FIG. 2A schematically shows a standard fan exit guide vane

FIG. 2A shows a fan exit guide vane 100 which may be positioned downstream of the fan rotor of FIG. 1. The exit guide vane 100 has an outer platform 102, an inner platform 104 and an airfoil 106 connecting the two.

Figure 2B:
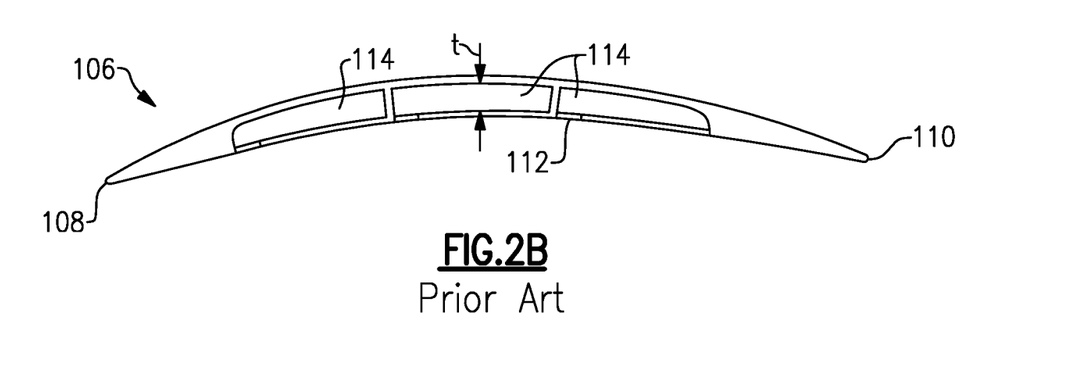
FIG. 2B is a cross-sectional view along line B-B of FIG. 2A.

As shown in FIG. 2B, an airfoil 106 extends from a leading edge 108 to a trailing edge 110. A perforated surface 112 is positioned over a plurality of cells 114. The chordwise length of each cell between the leading edge 108 and trailing edge 110 is utilized to design desired acoustic tuning for the cells 114. This limits the fraction of areas with perforation per total area since the chordwise extent of the perforated surfaces communicating with each cell can be no wider in the chordwise direction than the depth of the airfoil.

In addition, liquid water will often collect in the cells.

Figure 3A:
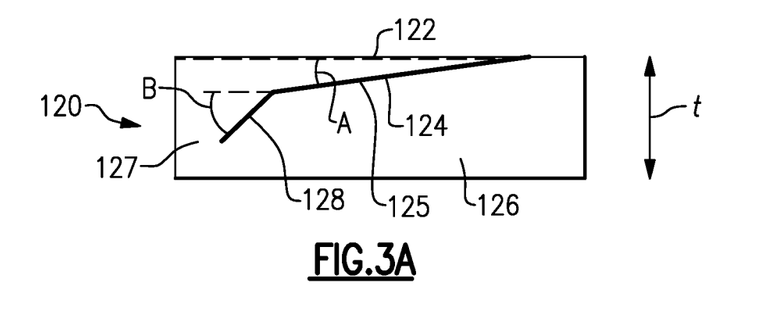
FIG. 3A shows a detail of an acoustic resonator cell according to this disclosure.

FIG. 3A shows a detail of a resonator array 120 according to this disclosure. A single cell 126 is illustrated in FIG. 3, and has a diverter member 124 extending directly from a perforated surface 122. The diverter member 124 has a first portion 125 extending from the perforated surface 122 at a first relatively small angle A, and then reaches a ramp 128 which extends away from the perforated surface 122 at an angle B, which is greater than angle A and to an opening 127. Angle A and B are less than 90°, although in some embodiments angle B may be 90°.

The diverter plate 124 serves to drain fluid away from the perforated face surface 122. As will be disclosed below, the location of the drainage openings and a directional bias of the diverter plate 124 will all be determined based upon on a final installation orientation of the acoustic resonator to facilitate drainage.

The division of the cell by the diverter plate 124 changes the acoustic features of the resonator array 120. In particular, while the chordwise span is controlling in the prior art array of FIG. 2B, now, the normal direction controls. This allows a greater percentage portion of the perforated surface to be utilized here.

Figure 3B:
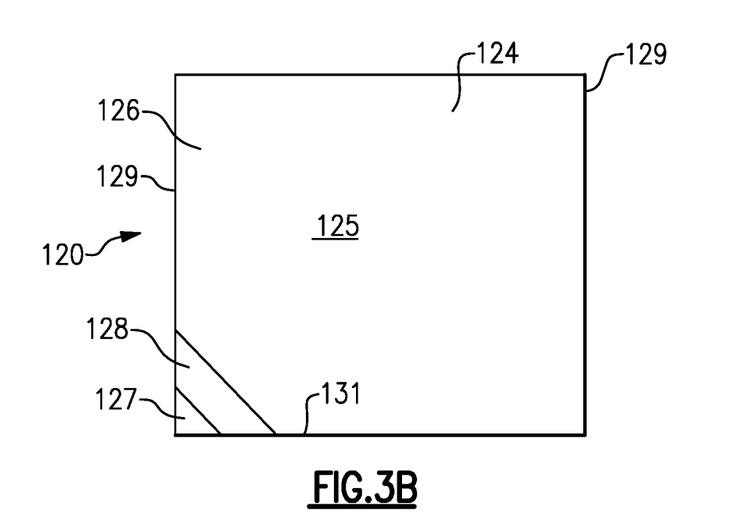
FIG. 3B is a top view of the FIG. 3A cell.

FIG. 3B shows that the diverter member first portion 125 generally fills the space between walls 129 and 131, with the ramp 128 and opening 127 found at one corner of the walls 129 and 131. Note, portion 125 and ramp 128 both connect into walls 129 and 131. The cell 126 is generally rhomboidal and four walls 129 and 131 define the cell.

Figure 4A:
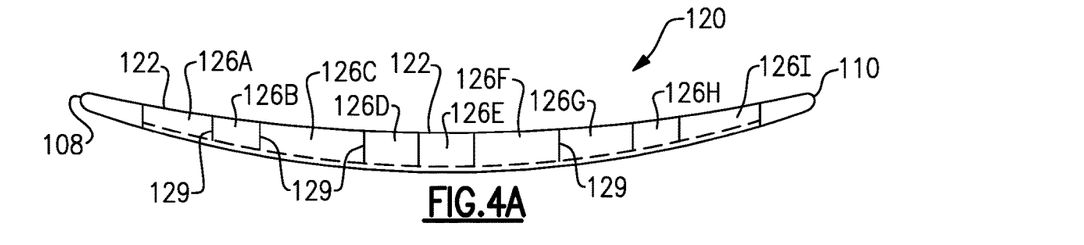
FIG. 4A shows a first feature of an acoustic resonator according to this disclosure.

FIG. 4A schematically shows an acoustic resonator array 120 in an airfoil having a plurality of cells 126A-126I. Walls 129 separate each of the cells. The cells can be seen to have different sizes, and include cells which are closer to the leading 108 and trailing edges 110 than was the case in the prior art of FIG. 2B.

Figure 4B:
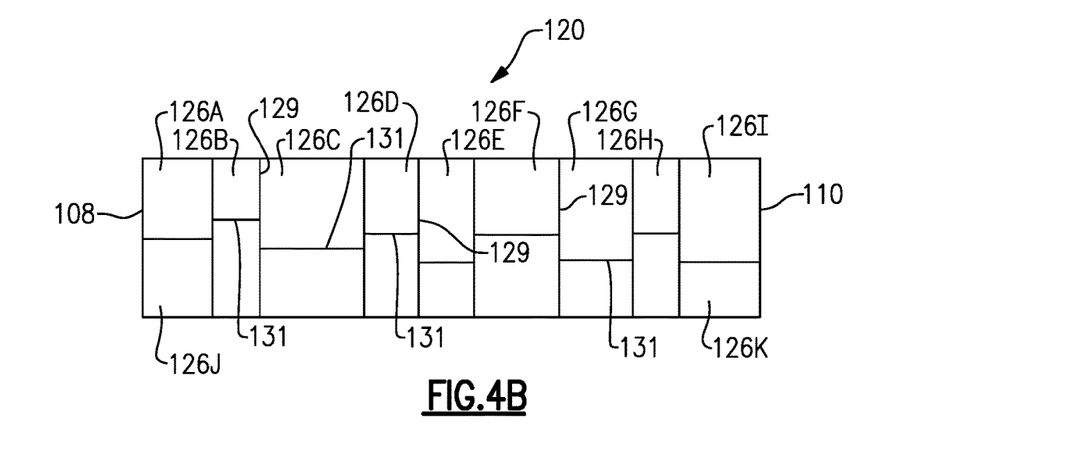
FIG. 4B shows another view of the FIG. 4A structure.

FIG. 4B shows a first column of cells 126A-128I extending between the leading edge 108 and trailing edge 110, and a second column of cells 126J-126K. As can be seen, walls 131 separate the columns. The two columns are staggered between adjacent cells 126. That is the separating walls 131 between adjacent cells are not aligned. As shown, the four walls 131 and 129 are at right angles relative to each other. Non-staggered embodiments also will benefit from this disclosure.

Figure 5A:
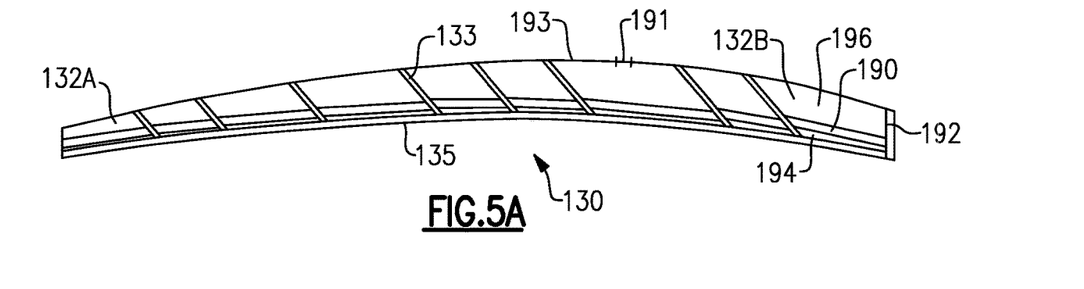
FIG. 5A shows an alternative resonator array embodiment.

FIG. 5A shows an alternative embodiment having cells 132A and 132B with the separating walls 133 formed to be canted, or at an angle, from the perforated surface 135. As shown, diverter plate 190 is not attached to the perforated surface 135. Still, it extends along an angle with a component away from the perforated surface 135, and thus does extend away from the face surface at a first angle. Here the diverter plate 190 extends from an end wall 192, or between the internal cell walls 133 at other locations. The diverter plate 190 separates an outer volume 194 from an inner cell volume 196. Although the opening is not illustrated here, there will still be the opening through the diverter plate to communicate the spaces 194 and 196.

Figure 5B:
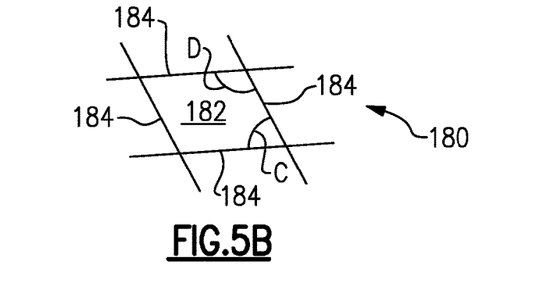
FIG. 5B show another alternative resonator array embodiment.

FIG. 5B shows an embodiment 180. In this embodiment, the four walls 184 which defines a cell 182 are not at right angles relative to each other. Rather, two angles C and two angles D are defined, with the angle C being less than 90 degrees and the angle B being greater than 90 degrees.

Figure 6:
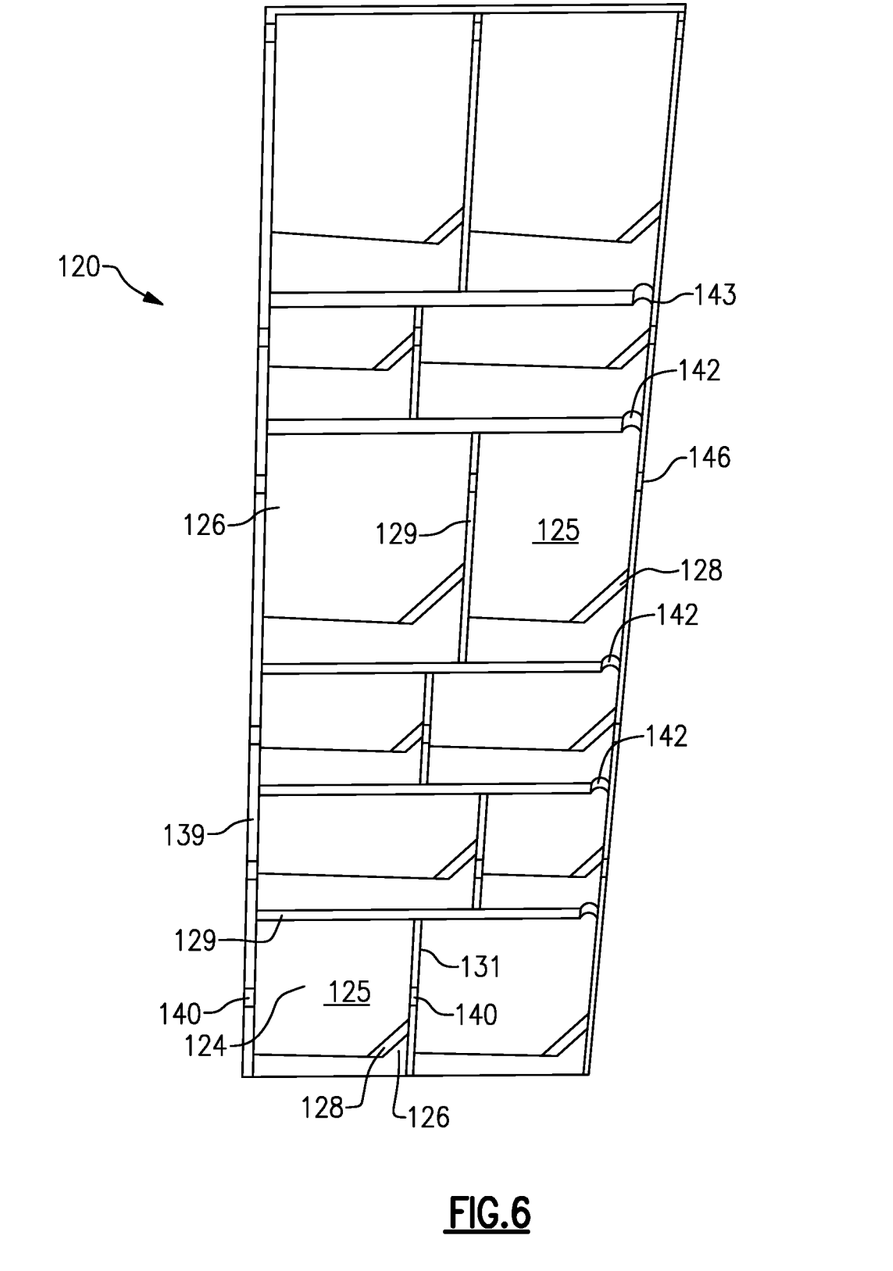
FIG. 6 is an end view of a plurality of cells in a resonator array according to this disclosure.

FIG. 6 is an end view of a plurality of cells 126 in a resonator array 120. There is a diverter plate 124 generally filling the spaces between the walls 129 and 131, and such that the bends, or ramps 128, of FIG. 3A are only at the corner, as explained above with regard to FIG. 3B.

As also shown there are also openings 140 in the walls 139, and intermediate walls 131 also have openings 140. Openings 142 allow water to move between cells in a common column. Those openings allow water to drain in between adjacent cells to outer openings 146 in an outer wall 143.

It should be understood, the shape of the resonator array in FIG. 6 is illustrated to show a possible orientation of drainage holes and diverter plates. Of course the overall outer boundaries would change based upon the shape of the airfoil. In addition, as mentioned above, the orientation and relative location of the drainage holes and diverter plates will be finalized once the final orientation of the airfoil in the gas turbine engine is determined.

Figure 7:
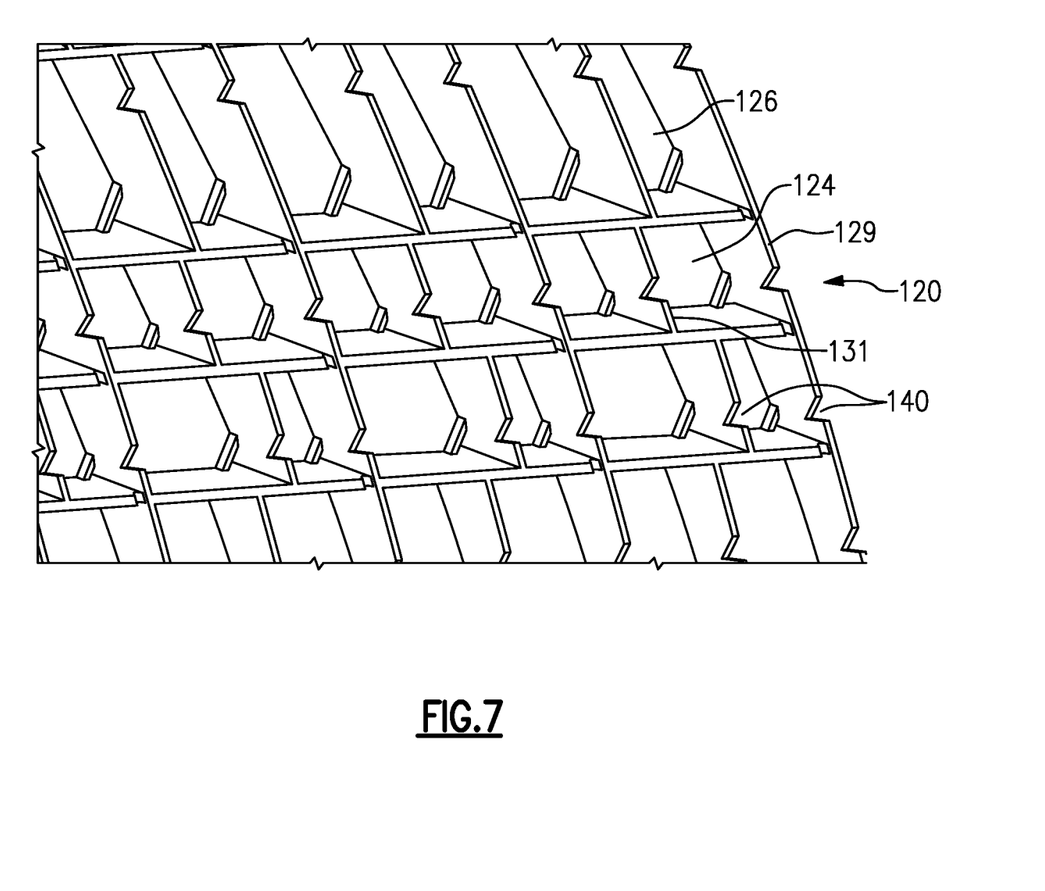
FIG. 7 is another view of the FIG. 6 array.

The array 120 is illustrated in FIG. 7 from the cell bottom surface, similar to the volume 196 as shown in FIG. 5A. One can see diverter plates 124 extending between walls 129 and 131. Also, openings 140 in the walls allow for drainage. In this embodiment, the liquid may drain towards ends of the airfoil, and between adjacent cells 126 until reaching the ends. Returning for a moment to FIG. 5A, in an alternative embodiment, an opening 191 could be formed through a rear wall 193 for each of the cells.

Figure 8:
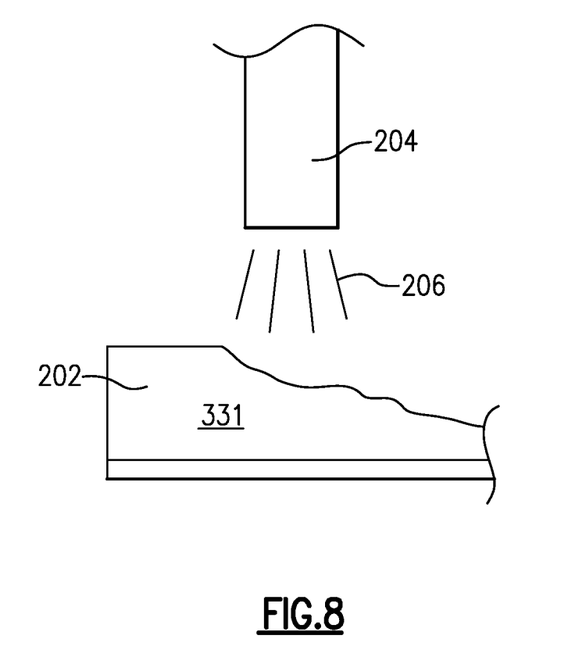
FIG. 8 schematically shows an additive manufacturing process being utilized to form the resonator array of this disclosure.

FIG. 8 schematically shows a formation of a resonator array according to this disclosure. An additive manufacturing process is illustrated forming an intermediate member 202 that will become the resonator array 120. Wall 131 is being formed as illustrated. An additive manufacturing machine 204 is shown depositing material 206 on to the intermediate product 202. Known additive manufacturing techniques may be used. Also, any number of materials may be used.

While the arrays are shown by lines that imply there may be separate parts, it is preferred that the entire structure be formed as a single component by the additive manufacturing process. Also, the entire vane may be formed as a single piece with the resonator array.

A gas turbine engine component under this disclosure could be said to include an airfoil extending between a leading edge and a trailing edge, and the airfoil having hollow cells with walls separating the plurality of hollow cells. A perforated surface having a plurality of perforations closes off the hollow cells. The hollow cells have a diverter plate which extends away from the perforated surface at a first angle for a first portion.

A method of forming a gas turbine engine component under this disclosure could be said to include the steps of utilizing additive manufacturing to form a gas turbine engine component having an airfoil extending between a leading edge and a trailing edge. The airfoil has hollow cells with walls separating the plurality of hollow cells, and a perforated surface has a plurality of perforations closing off the hollow cells. The hollow cells are provided with a diverter plate which extends away from the face surface at a first angle for a first portion, and then reaching a ramp extending away from the first portion at an increased angle relative to the first angle.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine component comprising:
   an airfoil extending between a leading edge and a trailing edge, the airfoil having a plurality of hollow cells with walls separating the plurality of hollow cells, a perforated surface having a plurality of perforations and closing off the hollow cells; and wherein
   the hollow cells have a diverter plate which is attached to and directly extends away from the perforated surface at a first angle; and
   wherein the diverter plate has a ramp that extends at the first angle, and wherein the ramp extends away from the perforated surface at an increased angle relative to the first angle.

2. The gas turbine engine component as set forth in claim 1, wherein the ramp ends before a separating wall to provide an opening further into the hollow cell.

3. The gas turbine engine component as set forth in claim 1, wherein there are at least two columns of hollow cells within the gas turbine engine component with column walls of said walls separating adjacent ones of the hollow cells between the leading edge and the trailing edge, and between adjacent ones of the hollow cells in the first and second columns.

4. The gas turbine engine component as set forth in claim 3, wherein the column walls separating adjacent ones of the hollow cells in the first and second columns are staggered relative to adjacent ones of the column walls separating the hollow cells in the first and second columns.

5. The gas turbine engine component as set forth in claim 3, wherein drainage holes are formed in the column walls separating the first and second columns to allow fluid to pass from one said hollow cell in one column to one said hollow cell in the other column.

6. The gas turbine engine component as set forth in claim 1, wherein the walls separating adjacent hollow cells between the leading edge and the trailing edge extend at an angle that is non-perpendicular to the perforated surface.

7. The gas turbine engine component as set forth in claim 1, wherein drainage holes are formed in outer ones of said walls defining the gas turbine engine component.

8. The gas turbine engine component as set forth in claim 1, wherein the gas turbine engine component is a static vane for use in a fan section.

9. A gas turbine engine component comprising:
   an airfoil extending between a leading edge and a trailing edge, the airfoil having a plurality of hollow cells with walls separating the plurality of hollow cells, a perforated surface having a plurality of perforations and closing off the hollow cells;
   the hollow cells have a diverter plate which extends away from the perforated surface at a first angle;
   wherein the diverter plate has a ramp that extends at the first angle, and wherein the ramp extends away from the perforated surface at an increased angle relative to the first angle;
   wherein the ramp ends before a separating wall to provide an opening further into the hollow cell; and
   wherein said hollow cells are defined between four of said walls, with a first portion of said diverter plate extending to connect to all four of said walls, and said ramp connecting to two of said walls.

10. The gas turbine engine component as set forth in claim 9, wherein the diverter plate extends directly away from the perforated surface, and is connected to the perforated surface.

11. The gas turbine engine component as set forth in claim 9, wherein the diverter plate extends away from the perforated surface at the first angle, but is not connected to the perforated surface.

12. A gas turbine engine comprising:
    a fan section for delivering air into a bypass duct and for delivering air into a compressor section, a combustor and a turbine section;
    said fan section including a fan rotor, and fan exit guide vanes positioned downstream of the fan rotor;
    the fan exit guide vanes having an airfoil extending between a leading edge and a trailing edge, the airfoil having a plurality of hollow cells with walls separating the plurality of hollow cells, a perforated surface having a plurality of perforations and closing off the hollow cells, the hollow cells provided with a diverter plate which is attached to and directly extends away from the perforated surface at a first angle; and
    wherein the diverter plate has a ramp that extends at the first angle, and wherein the ramp extends away from the perforated surface at an increased angle relative to the first angle.

13. The gas turbine engine as set forth in claim 12, wherein said hollow cells are defined between four of said walls, with a first portion of said diverter plate extending to connect to all four of said walls, and said ramp connecting to two of said walls.

14. The gas turbine engine as set forth in claim 12, wherein there are at least two columns of hollow cells within the gas turbine engine component with column walls of said walls separating adjacent ones of the hollow cells between the leading edge and the trailing edge, and between adjacent ones of the hollow cells in the first and second columns.

15. The gas turbine engine as set forth in claim 14, wherein the column walls separating adjacent ones of the hollow cells in the first and second columns are staggered relative to adjacent ones of the column walls separating the hollow cells in the first and second columns.

16. The gas turbine engine as set forth in claim 15, wherein drainage holes are formed in the walls separating the first and second columns to allow fluid to pass from one said hollow cell in one column to one said hollow cell in the other column.

17. The gas turbine engine as set forth in claim 12, wherein drainage holes are formed in outer ones of said walls defining the fan exit guide vanes.

18. A method of forming a gas turbine engine component comprising the steps of:
   utilizing additive manufacturing to form the gas turbine engine component having an airfoil extending between a leading edge and a trailing edge, the airfoil having hollow cells with walls separating the plurality of hollow cells, and a perforated surface having a plurality of perforations closing off the hollow cells, the hollow cells provided with a diverter plate which extends away from the perforated surface at a first angle; wherein the diverter plate has a ramp that extends at the first angle, and wherein the ramp extends away from the perforated surface at an increased angle relative to the first angle.

\* \* \* \* \*